June 19, 1973   J. R. DILLON   3,740,284
METHOD FOR MAKING TUBING
Filed May 24, 1971   4 Sheets-Sheet 1
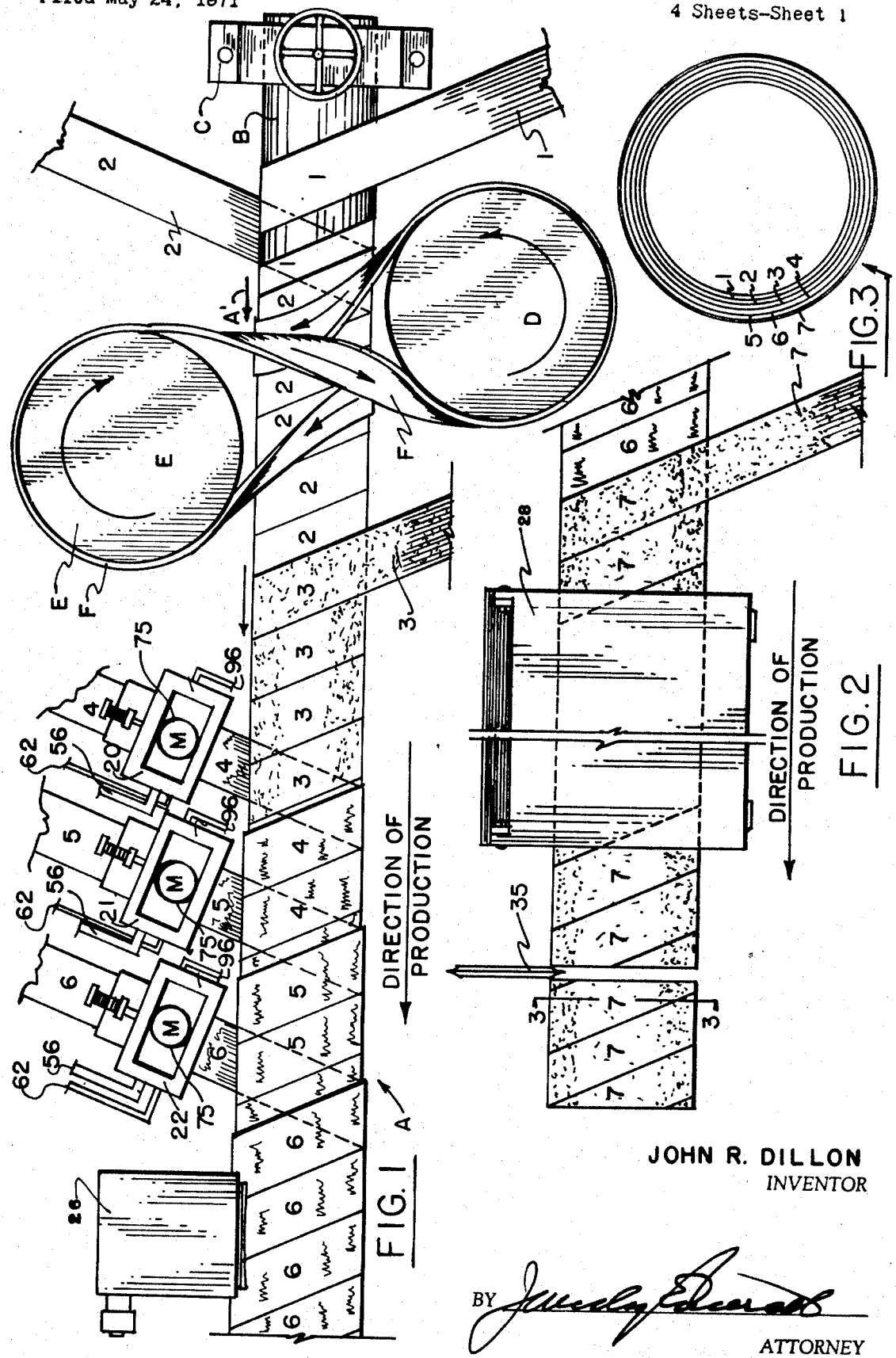
JOHN R. DILLON
INVENTOR
BY *[signature]*
ATTORNEY

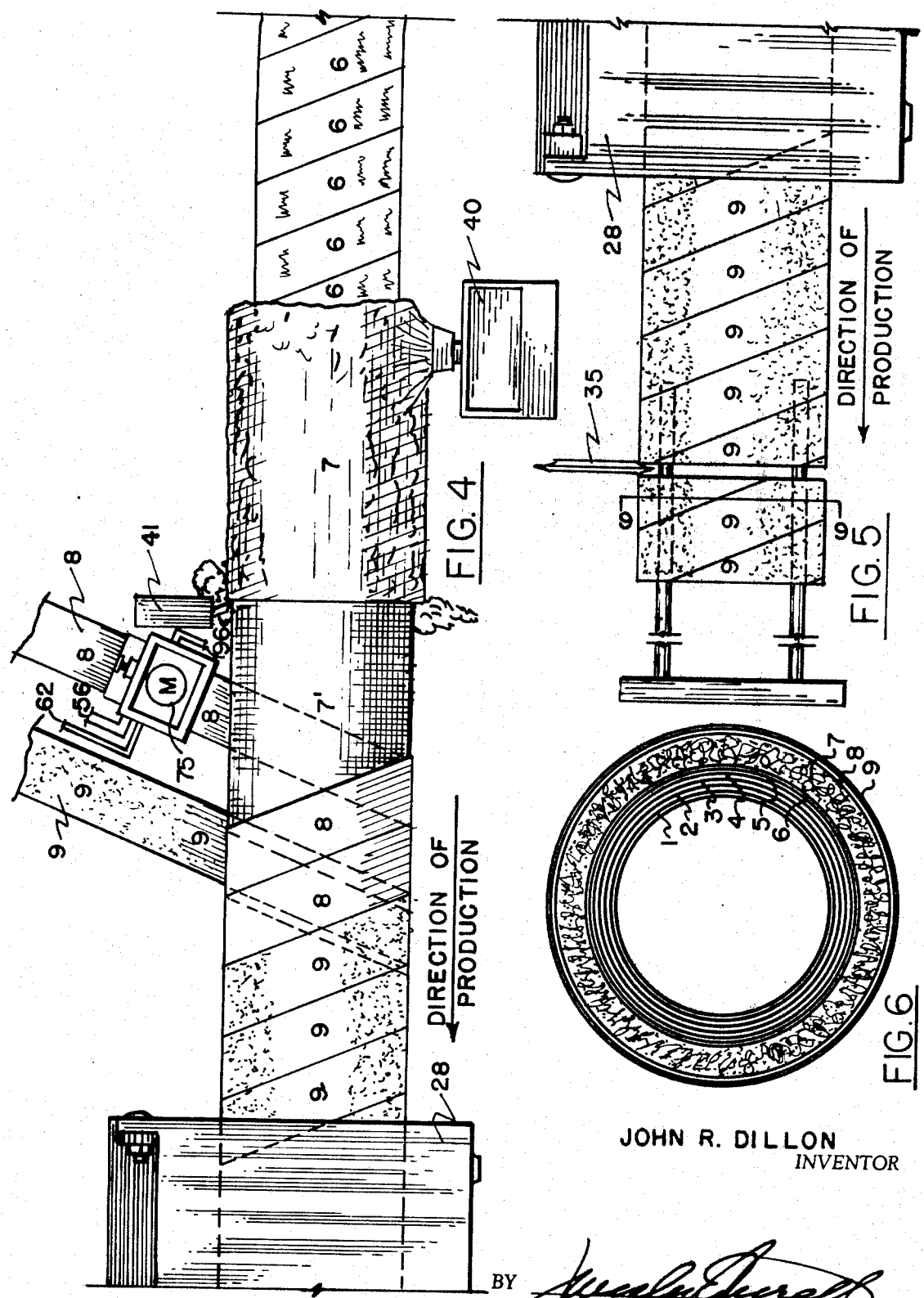

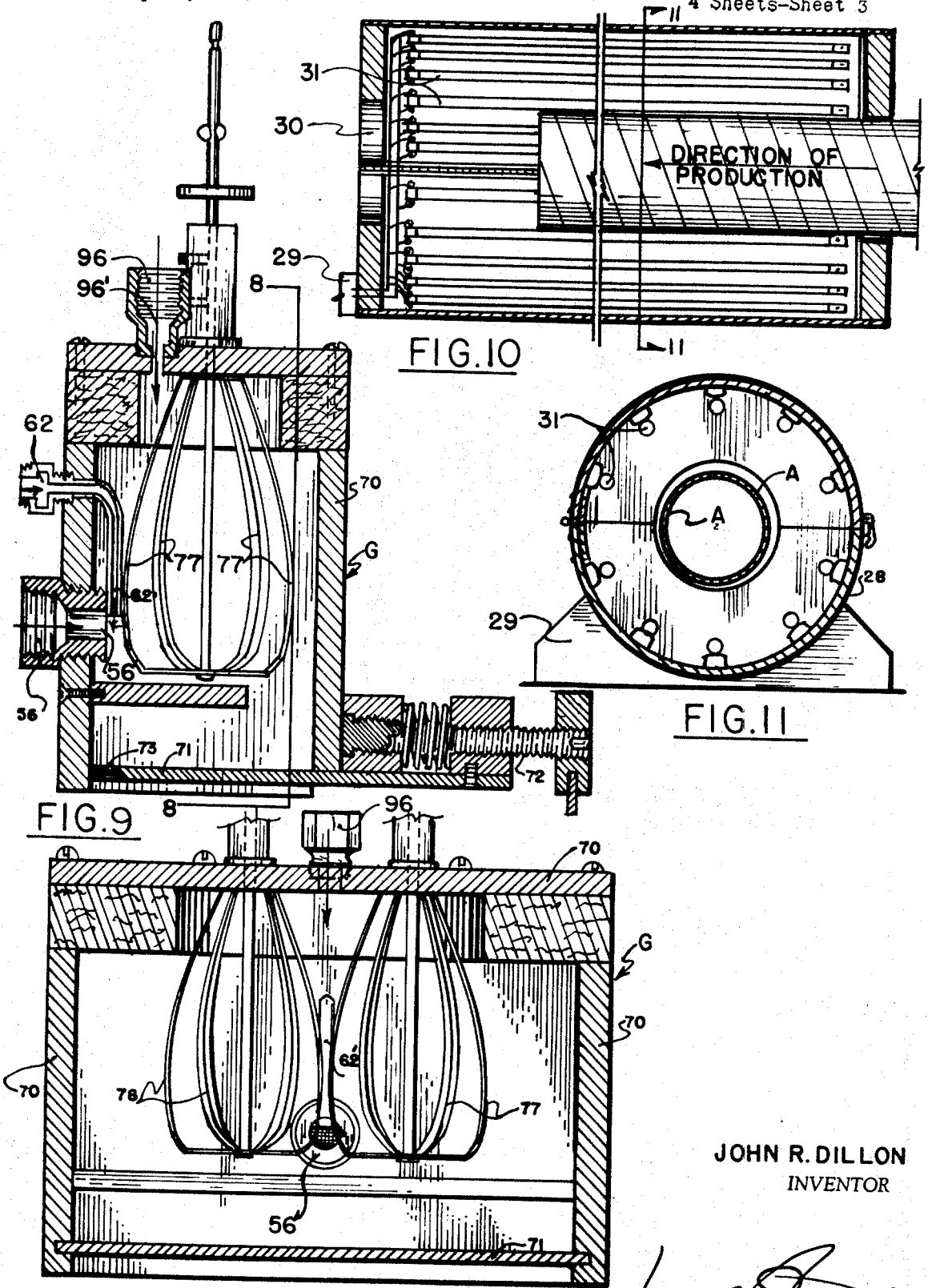

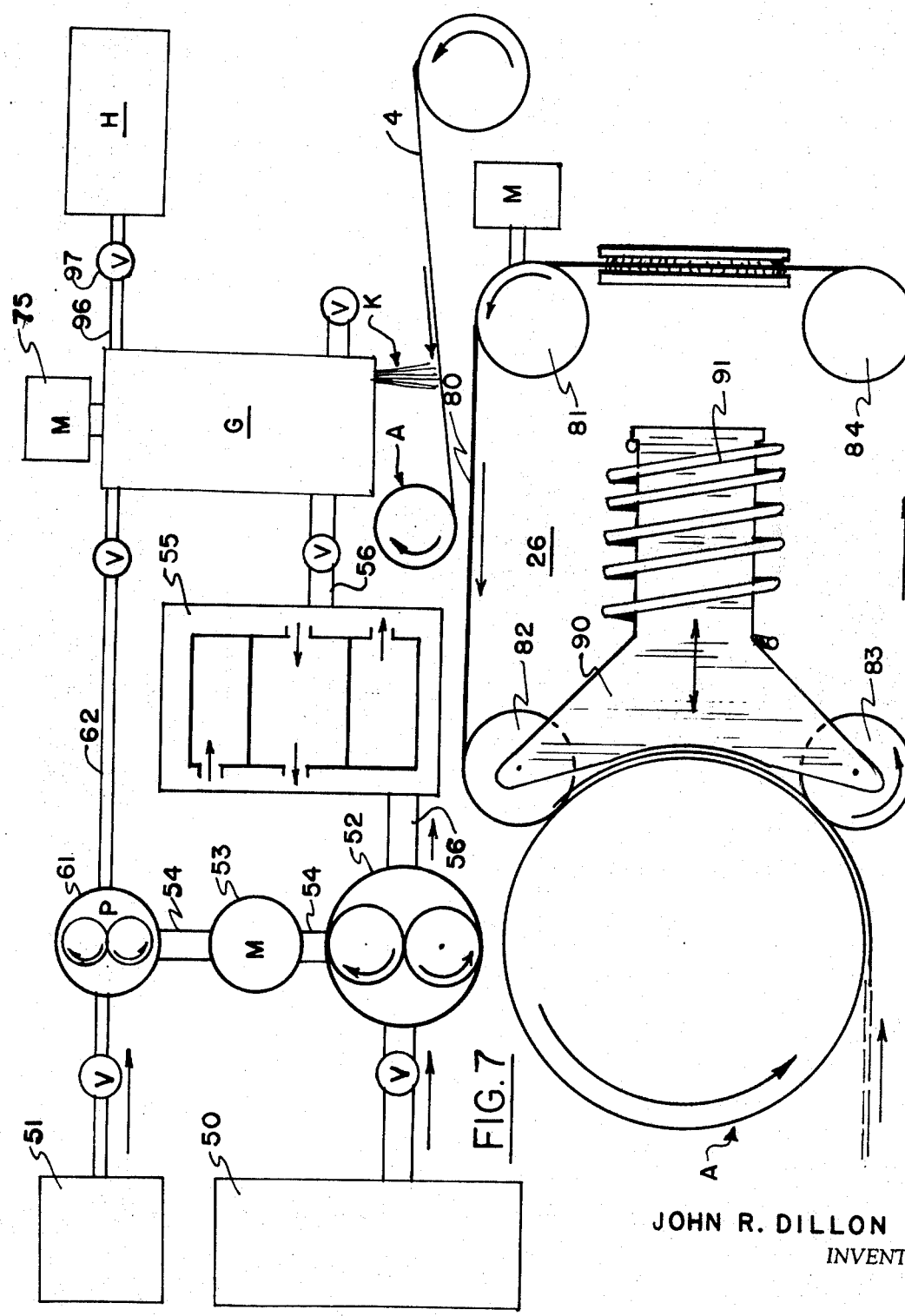

United States Patent Office 3,740,284
Patented June 19, 1973

3,740,284
METHOD FOR MAKING TUBING
John R. Dillon, 209 Bayside Drive,
Baltimore, Md. 21222
Filed May 24, 1971, Ser. No. 146,041
Int. Cl. B65h 81/00
U.S. Cl. 156—171         7 Claims

ABSTRACT OF THE DISCLOSURE

An improved method of making a continuous reenforced plastic tubing wherein the tube is made on a mold being continuously formed at the same time by wrapping strips of sheet material about a mandrel at an angle to the elongated axis of the mandrel, the tube being formed by wrapping strips of reenforcing material of predetermined width about the mold at different locations along the mold and at the same angle as the wrapping of the mold strips upon the mandrel and in which the reenforcing material is saturated with a liquid resin to which has been added a catalyst of a nature to cause the liquid resin to harden within a predetermined period under certain specified conditions.

---

The present invention relates to a method of making a reenforced tubing from strips or bands of reenforcing materials. The present method is particularly adapted for making tubing from a liquid resin to which has been added a hardening catalyst, and which may be referred to hereinafter as a plastic compound, reenforced with fiber glass strands or other suitable materials either in single parallel strands, or woven into a webbing. The reenforcing material may be of any kind to which the plastic compound will adhere or have an affinity for.

The problem in the past has been that the length of the tube was limited because the tube had to be made by hand layup methods upon a mandrel of substantially short length in order to have sufficient stability in the mandrel, which is a slow and expensive process.

It is the primary object of the present invention to overcome the limitations of making this type tube in short lengths by the hand lay-up method and to reduce the present manufacturing cost.

A further object of the invention is to provide a construction that may be modified in a number of ways to meet certain requirements for certain specific purposes. For example, the tube may be made of different thicknesses and/or insulated by adding certain steps to the basic operation.

While several objects of the invention have been pointd out, other objects, uses and advantages will appear as the nature of the invention is more fully described in the following detailed description with reference to the accompanying drawings, in which:

FIGS. 1 and 2 are a schematic plan view of the apparatus showing the several steps in carrying out the method of making one type of tubing.

FIG. 3 is a sectional view of the tubing taken along the line 3—3 of FIG. 2.

FIGS. 4 and 5 are a further schematic plan view of the method for making a modified form of tubing.

FIG. 6 is a section of the tubing taken along lines 6—6 in FIG. 5.

FIG. 7 is a flow diagram illustrating the flow of the liquid resin and catalyst compound to the reenforcing strips or bands.

FIG. 8 is an enlarged sectional view of a mixer for mixing the catalyst with the liquid resin.

FIG. 9 is a sectional view taken along the line 9—9 of FIG. 7.

FIG. 10 is a longitudinal sectional view of a heating unit for applying heat to the tube to assist in the hardening of the catalyzed resin.

FIG. 11 is a sectional view taken on the line 11—11 of FIG. 10.

FIG. 12 is a schematic view in elevation of a tamping unit for working the catalyzed resin around and between the strands of reenforcing materials.

It will be noted that the reenforcing material is referred to either as strips, or bands, and it may be made up of parallel strands or made up of a woven material. While the reenforcing material is specifically referred to as fiber glass, this reenforcing material may be of any suitable substance, made from either natural or artificial strands, or it may consist of wire, wire mesh, or a combination of wire and fibrous materials.

Referring particularly to FIGS. 1-6 through, FIG. 1 shows parts of a tube-winding machine on which a tube A is being made. This machine is old in the prior art, having the conventional mandrel B and a support C therefor, and also includes two conventional drums D and E about which a belt F is trained for wrapping the sheet material strips 1 and 2 about the mandrel to form the mold. The strips 1 and 2 are applied to the mandrel at an angle and the belt moves the mold tube along the mandrel in the direction of the arrow A′ as the mold is being made. The strips are so directed toward the mandrel that their edges either abut or overlap to form a continuous wall for the mold. The inner face of these strips 1 and 2 are generally provided with an adhesive in order that they will be united one to the other when wrapped about the mandrel, and are normally of non-porous, bendable material. While only two strips 1 and 2 are shown in making the mold, any number may be added. These strips may be of paper or other suitable material. If paper is used as a mold, it is normally removed from the finished tube; however, if the mold is to be retained as part of the finished tube, it is usually made of a more permanent and suitable material.

If the mold is to be removed from the finished tube, a separation strip 3 is wrapped about the mold in order that the mold may be shrunk without adhering to the inner surface of the finished tube. If the mold is to be left in the finished tube, the separator band is omitted.

Extending beyond the area where the separation strip 3 is applied, a first wrap 4 of reenforcing material is applied to the outer surface of the mold followed by wrappings 5 and 6. Prior to being wrapped about the mold, the plastic compound is applied to the inner surface of these strips 4, 5, and 6 from suitable applicator devices 20, 22 and 24, form of which applicator is shown in detail in FIGS. 8 and 9. Any number of reenforcing wrappings may be added. However, the separate reenforcing wrappings do not necessarily have to be of the same material.

After the final wrap of the reenforcing strips, or bands, there is provided a tamping device 26, a form of which is shown in detail in FIG. 12. The tamping device is operated against the outer surface of the tube A to even the surface of the plastic compound and to better distribute the plastic compound around and between the strands of the reenforcing materials. The tube is then preferably wrapped with a binder wrapping of suitable material, such as shown at 7 in FIG. 2, to hold the plastic compound in place around the outer surface of the tube.

The tube then passes through a heating unit 28, which may be supported upon a convenient support 29, for accelerating the hardening process of the plastic compound. One form of heater is of cylindrical form having a central opening 30 therethrough. The heating unit is provided with a plurality of variable controllable heating elements 31. When the plastic compound has reached a predetermined rigidity it may be cut into desired lengths by a suitable cut-off tool 35.

The tube A may also be insulated as shown best in FIGS. 4, 5 and 6. After the final wrapping of the reenforcing material, as shown and described for FIGS. 1 and 2, an insulating material may be sprayed over the surface of the last wrapping 6 as shown in FIG. 4, by a conventional spraying device 40. As the outer surface of the insulation is generally irregular, a trimming tool 41 may be employed to provide a uniform cylindrical surface 7' to the tube A.

After the surface of the tube has been trimmed, a reenforcing strip 8, having a coating of the plastic compound, may be applied over the insulation as previously described for bands 4, 5 and 6. In order to confine the plastic compound to the insulation and strip 8, a sealing strip 9 may also be applied over the outer surface of the reenforcing strip similar to the sealing strip 7 as shown in FIG. 2 when no insulation is applied.

Referring more particularly to the plastic compound, a schematic system of applying the same to the reenforcing strip is shown in FIG. 7. Bulk liquid resin is carried in a tank 50, and a liquid catalyst for reacting with the resin to harden the same is carried in a storage tank 51. The resin is pumped by a pump 52 operated by a motor 53 through the shaft 54 to a heating unit 55 for heating the liquid resin to a predetermined degree. The resin is then forced into a mixing chamber G through the pipe 56.

The resin is in a liquid state until it reaches the mixing chamber G where it is mixed with the hardening catalyst. The catalyst is also in liquid form and is kept separate until ready for use in the storage tank 51 from which it is pumped by a suitable pump 61 operated preferably by the motor 53 through the shaft 54. The catalyst passes through the pipe 62 to the mixing chamber G where the resin and the catalyst are thoroughly mixed in predetermined proportions to cause the hardening of the resin. The plastic compound, designated by the letter K, is then fed onto the strips or bands of reenforcing material as represented by the number 4, after which the strip is wrapped about the mold to form the tube A. For illustrating the making of the form of tube shown in FIGS. 1 and 2, three reenforcing strips 4, 5 and 6 are shown; however, any number of reenforcing bands may be used to make up the tube.

Referring in particular to the mixing unit G for mixing the resin and the catalyst, the unit is contained in a housing 70 having a slidable bottom 71 which is operable by a thumb screw 72 to vary the opening 73. The width of the band of reenforcing material.

It will be noted that the resin and the catalyst are released in the mixing apparatus G in substantially the same location, that is, pipe 56 leads to the inlet 56' for the resin, and pipe 62 leads to the inlet 62' for the catalyst, the catalyst being released adjacent the flow of resin entering the mixer. The mixing is shown being performed by rotatable beaters 77 and 78 which may be rotated by a suitable motor 75, see FIG. 7.

One form of tamping device is illustrated in FIG. 12. The tube A is shown rotating in the direction of the arrow. The tamper 26 is shown with a belt 80, preferably rotated in the direction of the arrow shown adjacent thereto. The belt is extended about a drive roll 81 and idler rolls 82, 83 and 84. The rollers 82 and 83 are carried on a separate frame unit 90 and may be vibrated by an electric vibration coil 91. The vibrating action of the rollers 82 and 83 and the belt 80 moving relative to the surface of the tube A will cause the plastic compound to wet-out the reenforcing strips, causing the compound to move in and around the separate strands in the reenforcing strips and distributing the plastic composition evenly over and around the strands, and give the tube a smooth surface. As the catalyst has been mixed with the liquid resin, the mixture will begin to set and harden within a short time, and, therefore, if the operation is stopped for any reason, the mixer G must be cleared of its contents. For this purpose there is provided a cleaning liquid carried within a container H which may be piped into the mixer G through the pipe 96 and the opening 96' by operation of the valve 97 for cleaning the mixed plastic compound from the mixer.

Referring again to the plastic compound consisting of resin combined with a hardening catalyst, it is not intended that the compound be of the particular type specifically described herein or applied to the reenforcing strips in this specific manner. As an example, a plastic compound may be pre-mixed and stored at low temperature and subsequently applied to the reenforcing strips. Also, the plastic compound may be applied in any suitable manner, such as, running the strips through a bath of the compound, or by spraying the compound directly on the strips of reenforcing material, or on the material as it is rolled around the mold.

It should also be noted that the specific mixing chamber shown in detail in FIGS. 8 and 9 is only one type of mixer that may be used. There are many types of mixer any one of which may be substituted for the one shown and described herein.

While a specific device has been shown for carrying out the present method, it is not intended as a limitation of the invention as the scope of the invention is best defined in the appended claims.

I claim:

1. A method of making continuous reenforced plastic tubing comprising the steps:
    (a) forming a continuous mold by wrapping at least one strip of sheet material at an angle about a mandrel of predetermined diameter, means to cause the mold to advance along the mandrel as the strip is being wrapped thereon securing each successive wrapping of the sheet at least to the near edge of the wrap previously made about the mandrel to form a continuous mold wall;
    (b) helically winding on the outer surface of the mold at least one strip of strand-like reenforcing material;
    (c) impregnating the reenforcing material with a catalyzed resin as it is being wrapped about the mold, the reenforcing strip being wrapped about the mold at substantially the same angle as the mold strip is wrapped on the mandrel, at least a portion of the forward edge of each successive winding of the reenforcing strip being abutted or overlapping the near edge of the previous wrapping of the strip to form a continuous rigid reenforced wall tube;
    (d) heating the said tube after the resin impregnated reenforcing material has been wrapped about the mold to advance the curing time of the said resin.

2. In a method of making tubes as claimed in claim 1 wherein is included the step of adding a separation strip over the wrapping of the mold strip.

3. In a method of making tubes as claimed in claim 1 wherein is included the step of adding a plurality of layers of reenforcing strip windings for increasing the thickness of the tube wall.

4. In a method of making tubing as claimed in claim 3 wherein is added the step of agitating the catalyzed resin after the same has been added to the reenforcing strips for insuring a more even distribution of the said resin about the strands.

5. In a method of making tubing as claimed in claim 1 wherein is added the step of applying a sealing strip over the last wrapping of the reenforcing strip.

6. In a method of making tubing as claimed in claim 1 wherein is added the step of applying a foam plastic to the outer surface of the last reenforcing strip as an insulation material and applying at least one binding strip to the outer surface of the said insulation material.

7. The method of making tubing as claimed in claim 1 wherein adding the step of removing the mold wrapping after the curing of the tube has reached at least the stage of retaining its shape unsupported.

References Cited

UNITED STATES PATENTS

| | | | |
|---|---|---|---|
| 2,614,058 | 10/1952 | Francis | 156—171 |
| 3,522,122 | 7/1970 | Ganahl | 156—171 |
| 2,405,909 | 8/1946 | Smith et al. | 156—171 |

DAVID KLEIN, Primary Examiner

J. L. GOODROW, Assistant Examiner

U.S. Cl. X.R.

156—174